June 6, 1961  R. D. GREGG ET AL  2,987,164
MATERIALS HANDLING APPARATUS
Filed July 25, 1958  10 Sheets-Sheet 5
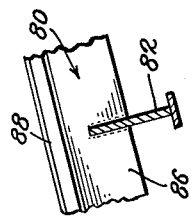
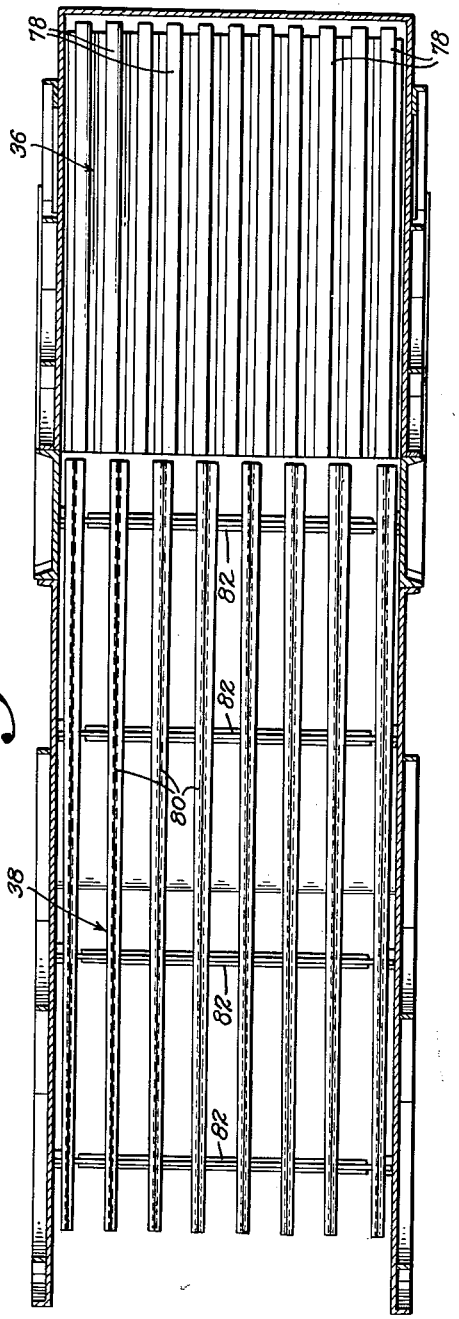
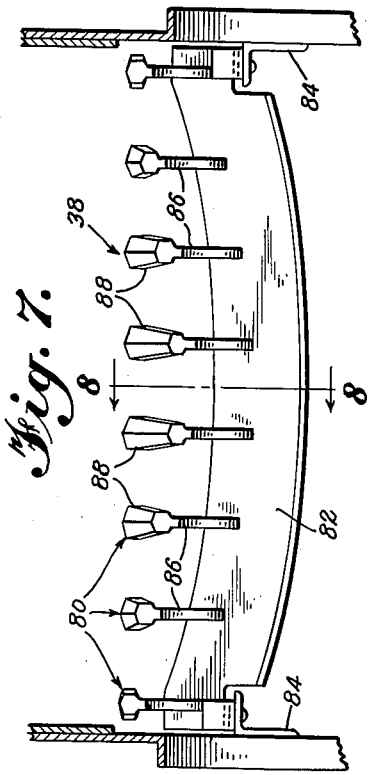

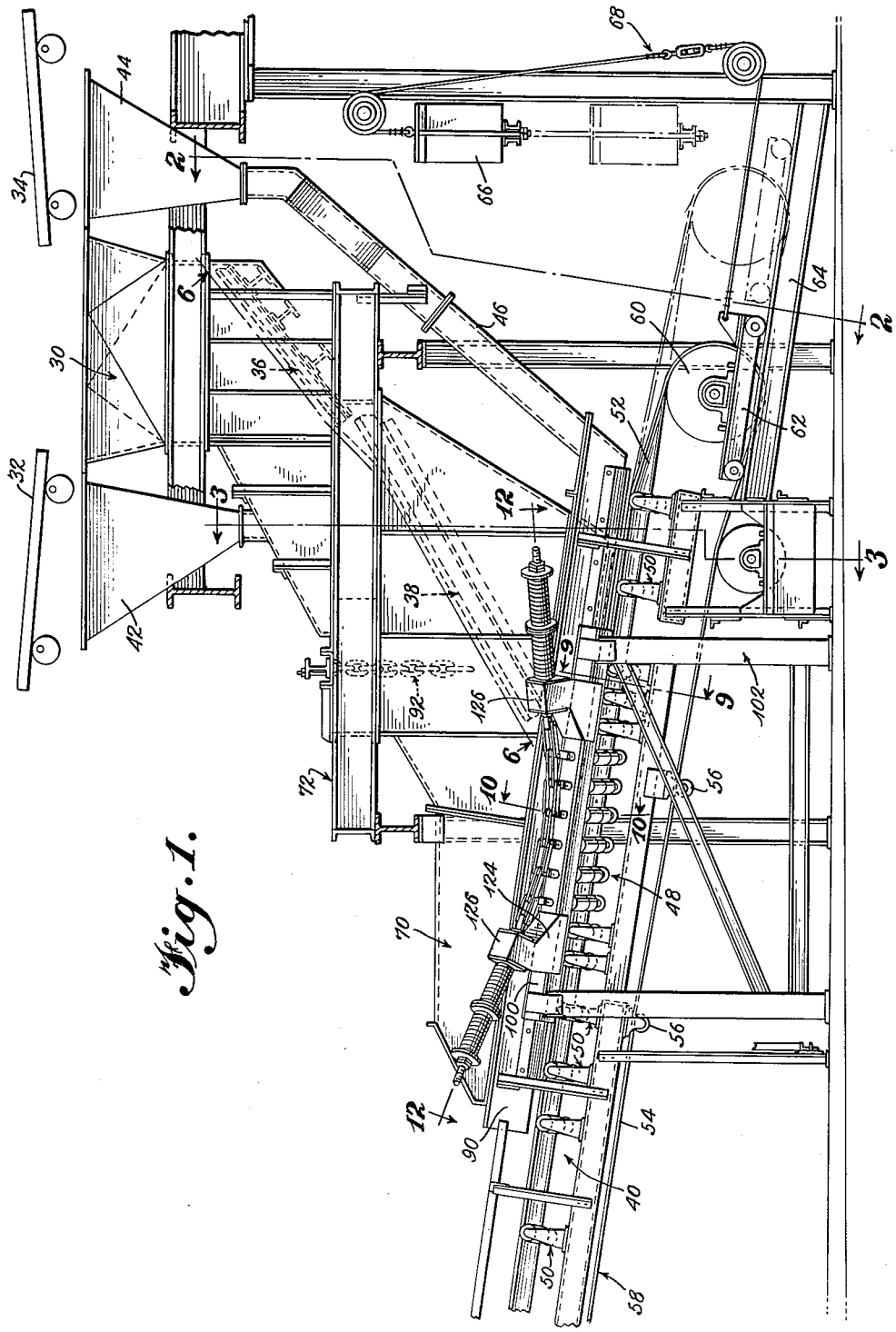

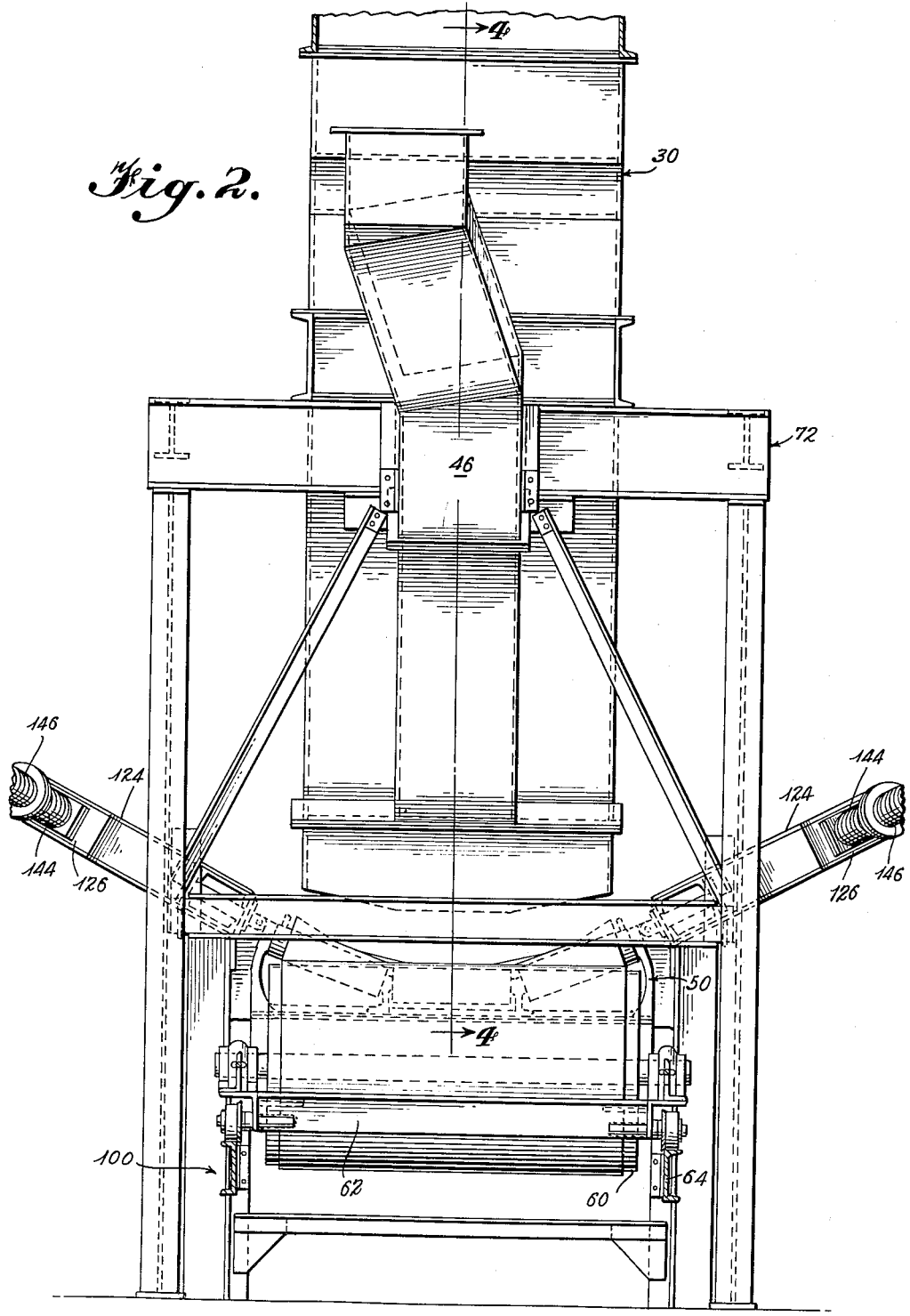

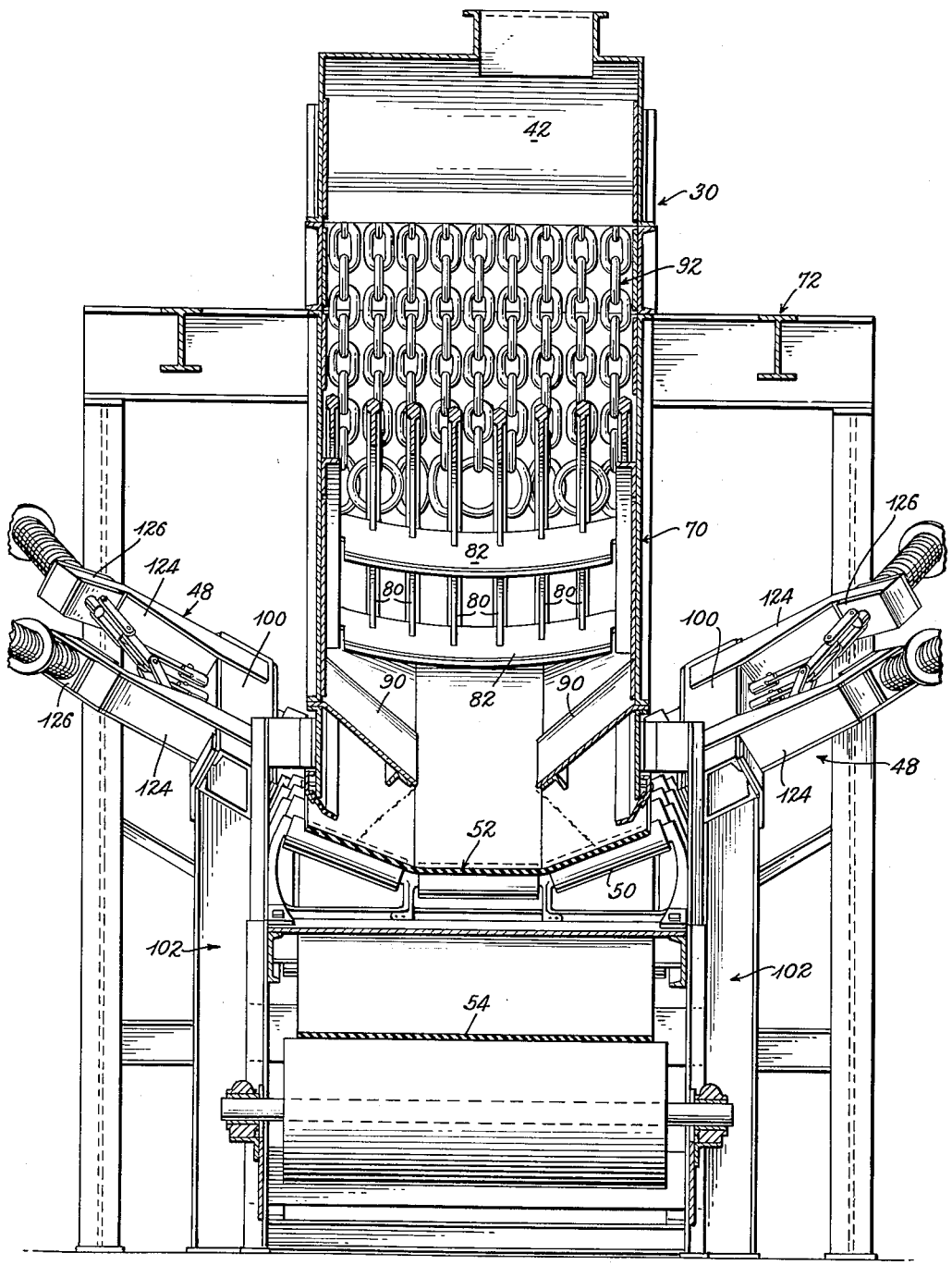

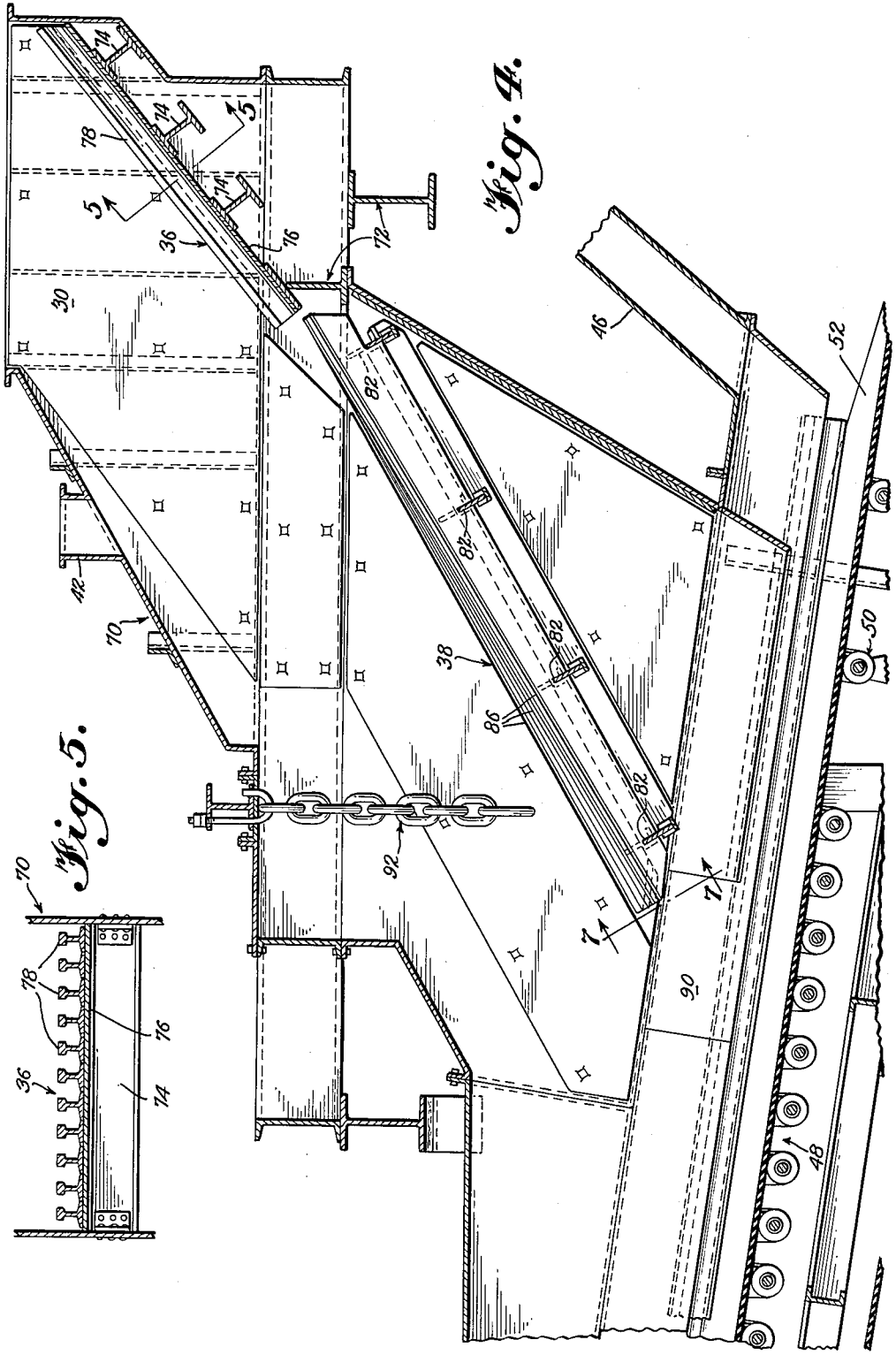

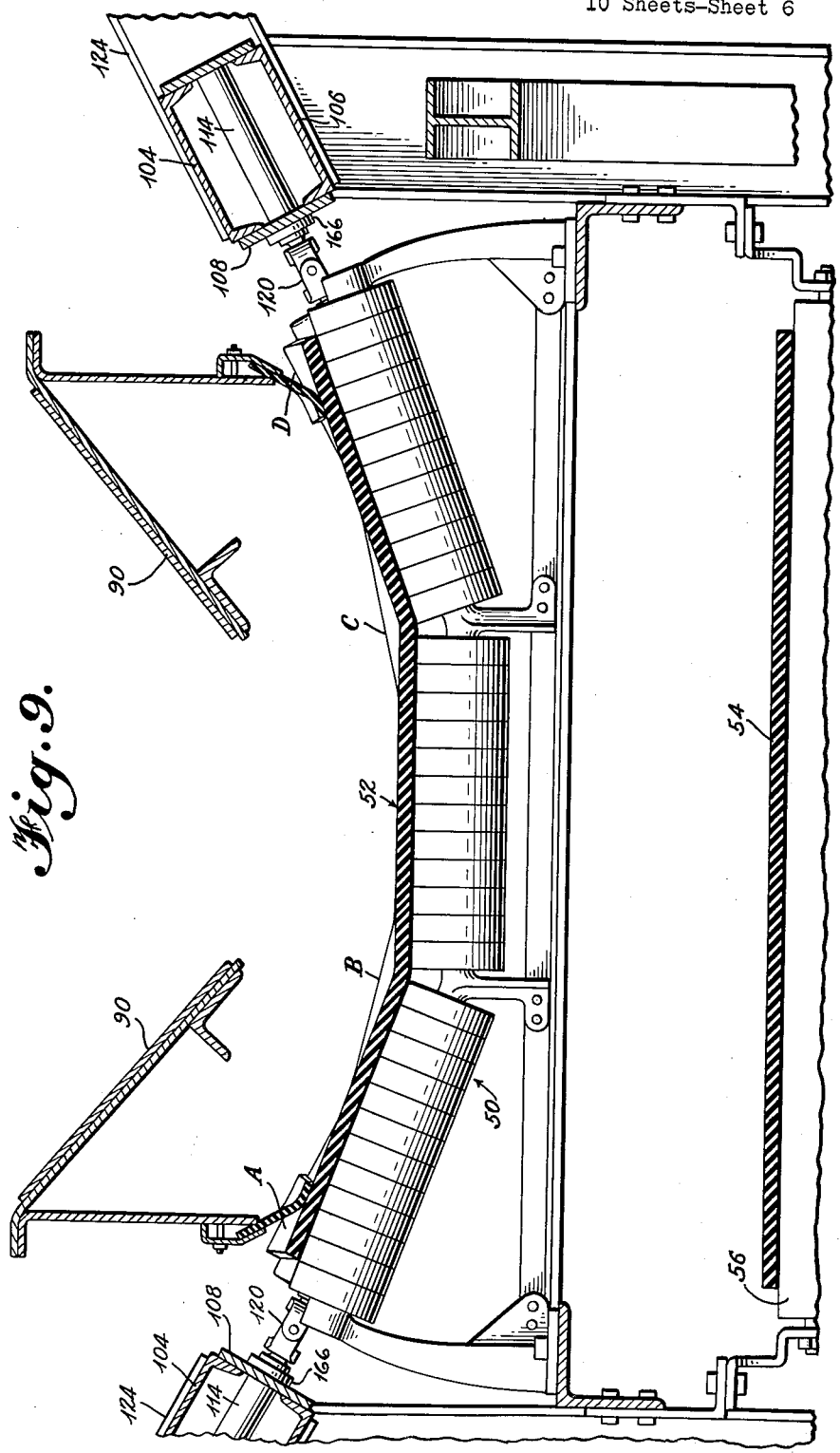

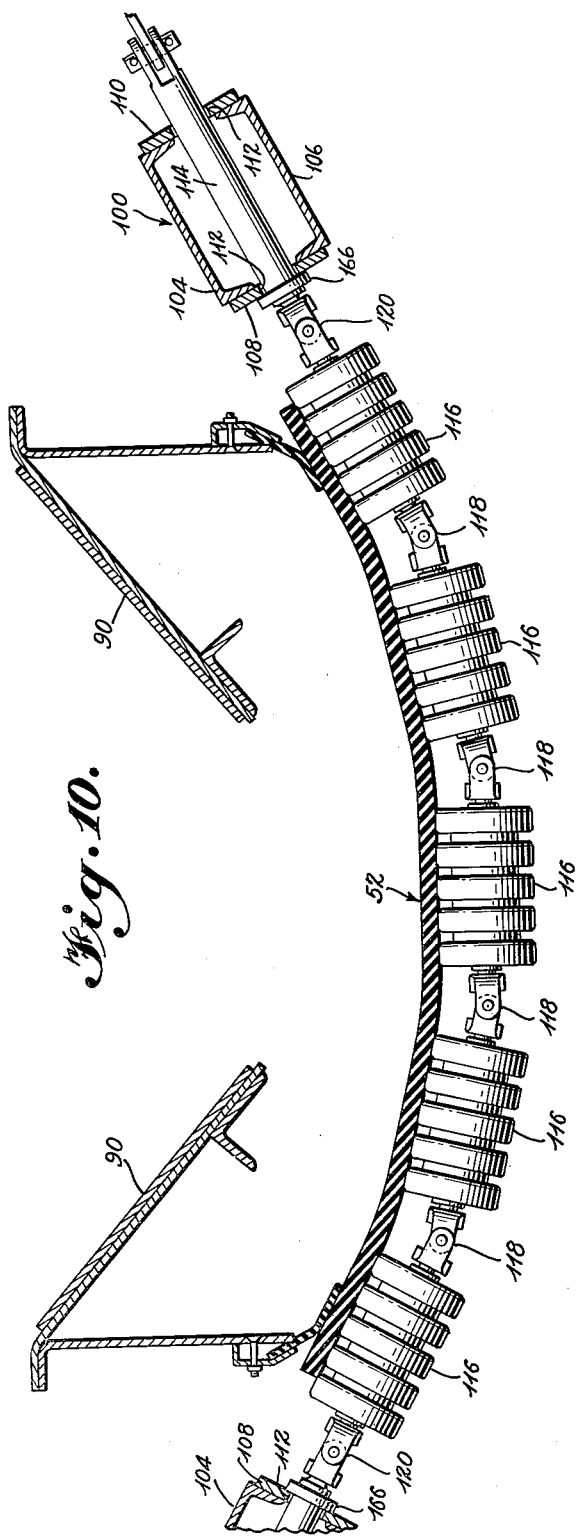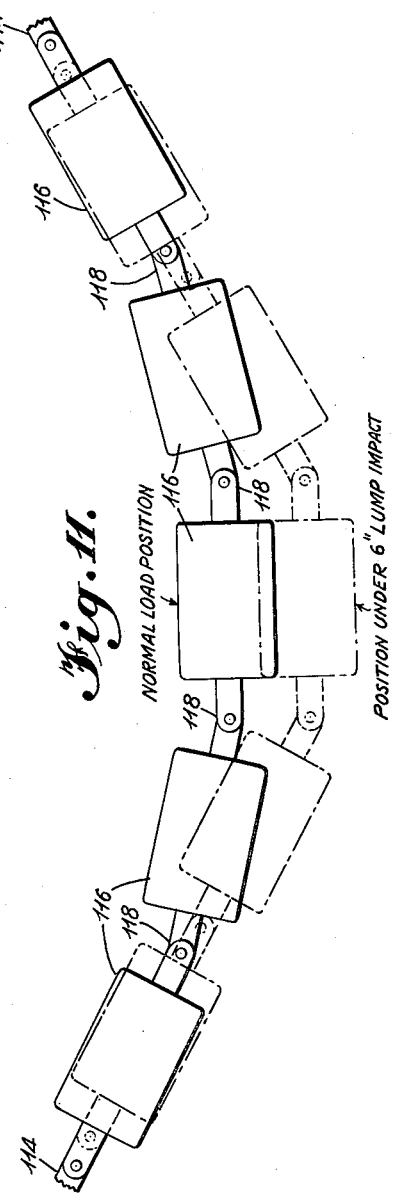

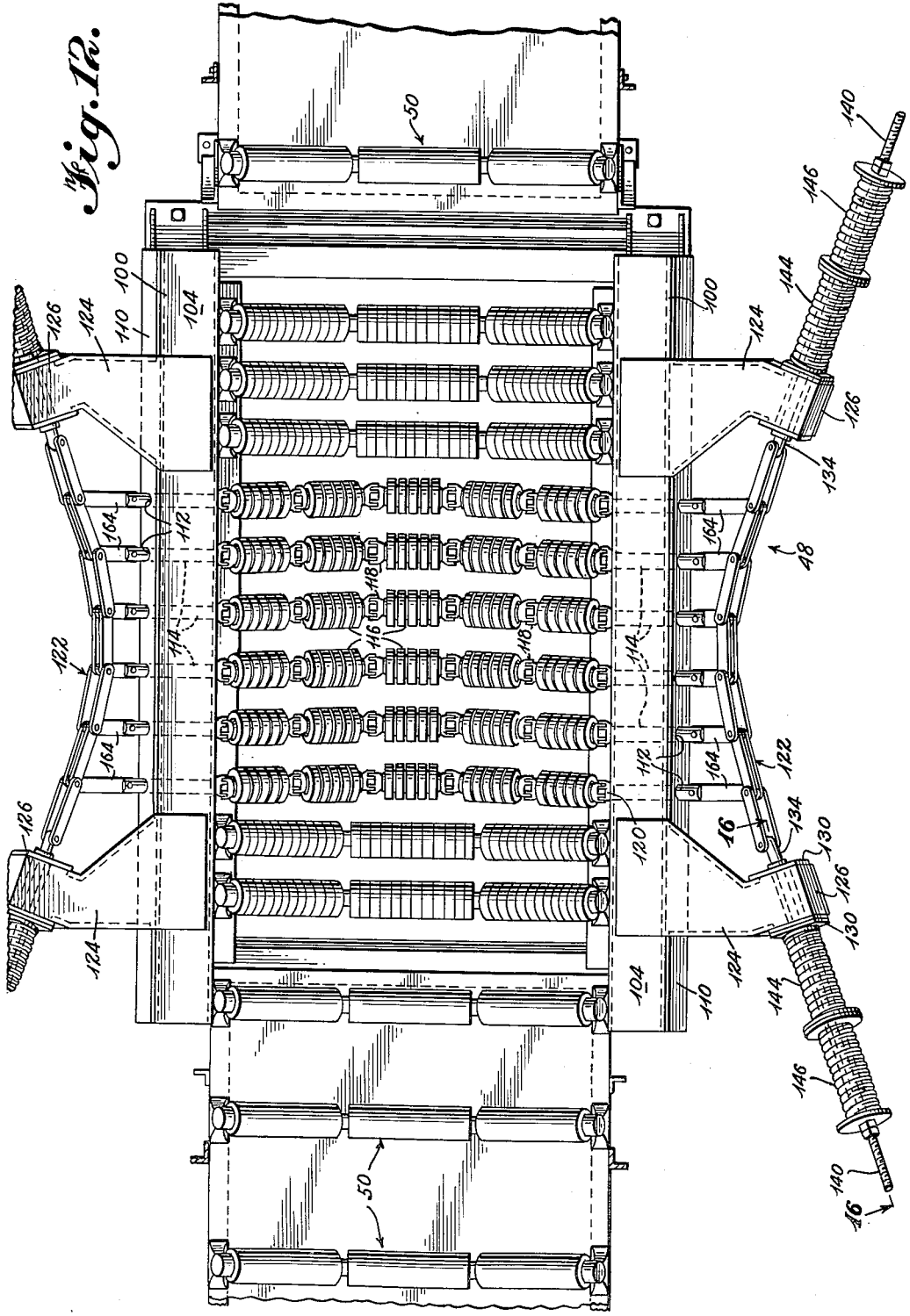

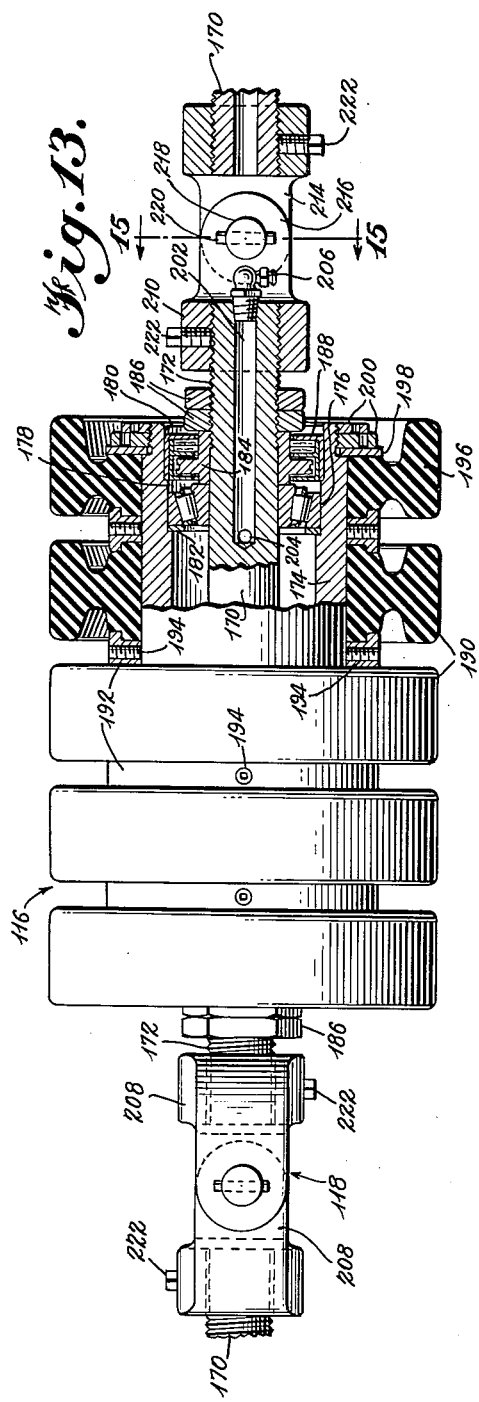
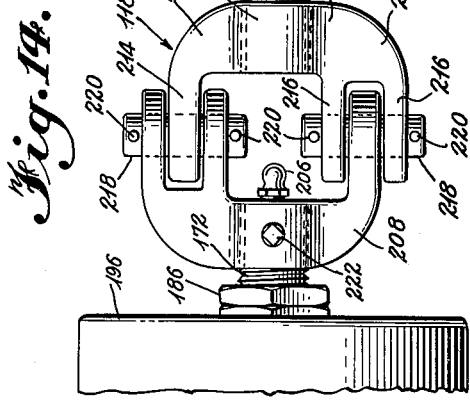
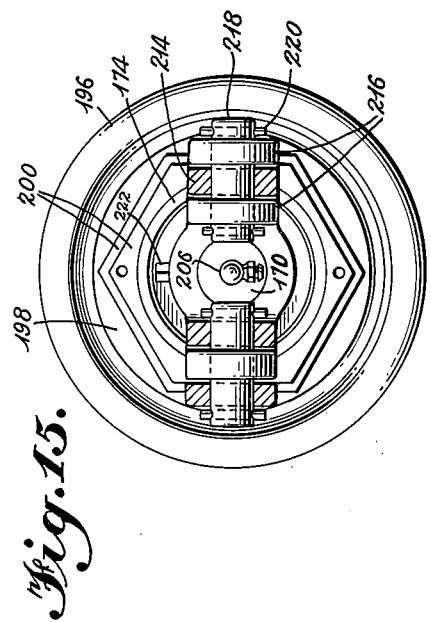

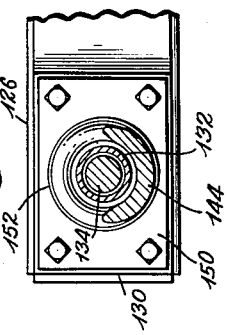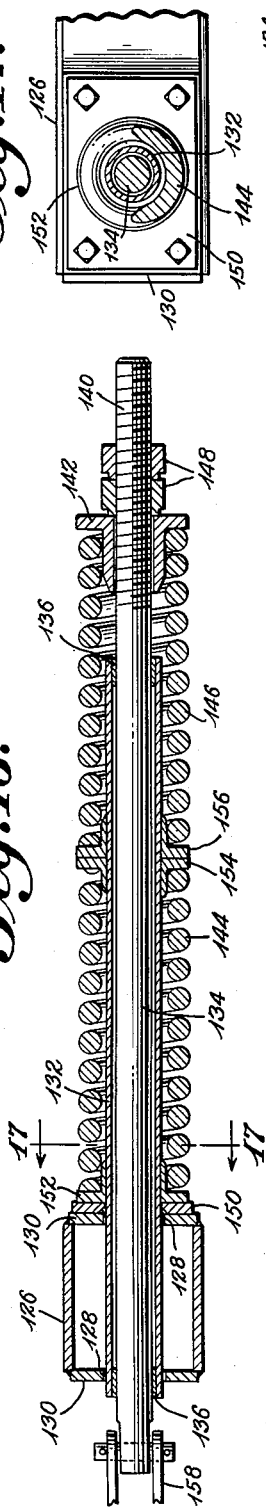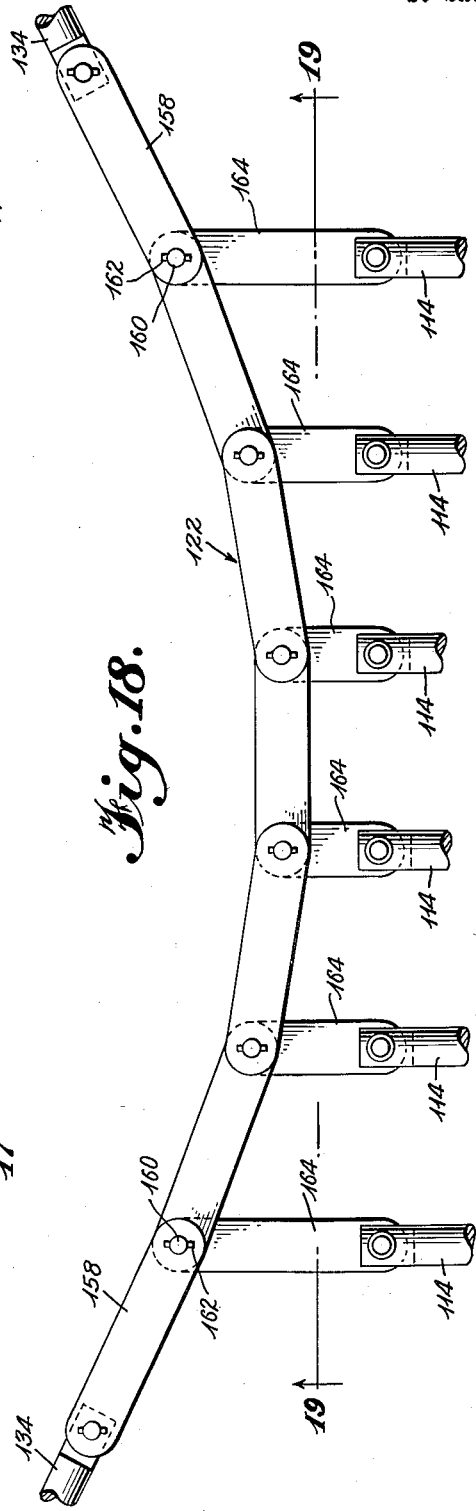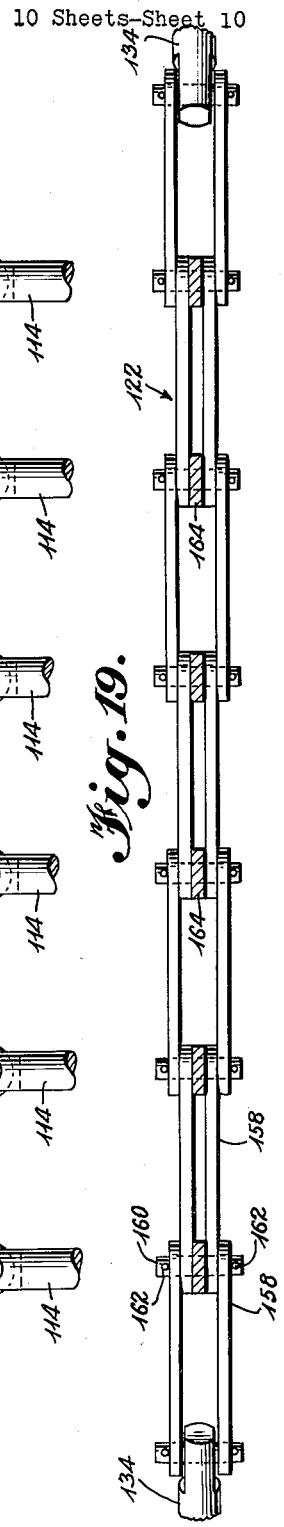

United States Patent Office 2,987,164
Patented June 6, 1961

2,987,164
MATERIALS HANDLING APPARATUS
Robert D. Gregg, Wheaton, and Richard B. Persson, Skokie, Ill., assignors to Link-Belt Company, a corporation of Illinois
Filed July 25, 1958, Ser. No. 750,935
17 Claims. (Cl. 198—52)

This invention relates to material handling apparatus, and more particularly to apparatus for loading heavy lump material onto conveyors.

A primary object of the invention is to provide apparatus for efficiently loading material such as heavy lumps of rock, ore, coal, or the like, onto a belt conveyor with a minimum amount of wear on the conveying belt.

Another object of the invention is to provide a loading apparatus for a belt conveyor which includes an impact absorption unit arranged to permit controlled cushioned deflection of the carrying run of the belt under the application of impact loads.

Another object of the invention is to provide an impact absorption unit which permits the carrying run of a belt conveyor to partake of a resiliently cushioned flexing movement under the application of impact loads.

Still another object of the invention is to provide an impact absorption unit for a belt conveyor having a plurality of interchangeable belt supporting, idler roll assemblies arranged to flex and resiliently deflect under the application of impact loads to the carrying run of the conveyor.

Other objects and features of the invention will become readily apparent from the following specification taken in conjunction with the accompanying drawings.

In the drawings:

FIGURE 1 is a side elevational view of a preferred form of apparatus embodying the invention;

FIGURE 2 is a cross sectional view of the apparatus taken on line 2—2 of FIG. 1;

FIGURE 3 is a cross sectional view of the apparatus taken on line 3—3 of FIG. 1;

FIGURE 4 is a cross sectional view of the apparatus taken on line 4—4 of FIG. 2;

FIGURE 5 is a detail cross sectional view taken on line 5—5 of FIG. 4;

FIGURE 6 is a cross sectional view of the apparatus taken on line 6—6 of FIG. 1;

FIGURE 7 is a detail cross sectional view taken on line 7—7 of FIG. 4;

FIGURE 8 is a detail cross sectional view taken on line 8—8 of FIG. 7;

FIGURE 9 is a detail cross sectional view taken on line 9—9 of FIG. 1;

FIGURE 10 is a detail cross sectional view taken on line 10—10 of FIG. 1;

FIGURE 11 is a sketch showing the relative movement of the idler roll assembly of FIG. 10 under the application of an impact load;

FIGURE 12 is a detail plan view taken on line 12—12 of FIG. 1;

FIGURE 13 is a detail view, partially in cross section, of one of the impact rolls of the idler assembly of FIG. 10;

FIGURE 14 is a detail view of the structure employed to couple adjacent idler rolls to each other;

FIGURE 15 is a cross sectional view of one impact roll taken on line 15—15 of FIG. 13;

FIGURE 16 is a detail sectional view of a tensioning spring assembly taken on line 16—16 of FIG. 12;

FIGURE 17 is a detail cross sectional view of the tensioning spring assembly taken on line 17—17 of FIG. 16;

FIGURE 18 is a detail view of the flexible tensioning member; and,

FIGURE 19 is a cross sectional view of the flexible tensioning member taken on line 19—19 of FIG. 18.

Referring first to FIG. 1, a typical installation for loading run of the mine coal, ore, or the like, onto a belt conveyor has been partially illustrated. In this particular installation, the material to be loaded is fed into the main loading chute 30 by opposed reciprocating plate feeders 32 and 34 of conventional construction. The plate feeders 32 and 34 in this particular installation are located at the bottom of hoppers, not shown, which receive the material to be handled in any suitable manner, such as from hopper bottom railway cars, or the like.

Material fed into the loading chute assembly 30 from the plate feeders falls upon an inclined chute section 36 and passes, by gravity, onto the bars of a grizzly 38. This grizzly overlies the carrying run of, and is inclined downwardly toward, the conveyor 40 in the direction of travel of the carrying run. Material discharged from the lower end of the grizzly 38 falls upon the carrying run of said belt conveyor 40.

Auxiliary chutes 42 and 44 are located beneath each of the respective plate feeders 32 and 34 to conduct whatever material may spill over their sides onto the belt conveyor 40. Material passing through the chute 44 is conducted directly to the conveying surface of the belt conveyor 40 by the chute section 46 while material passing through the chute 42 falls upon the surface of grizzly 38 and is thence conducted to the conveyor 40.

An impact absorption unit 48 is substituted for the conventional troughed idler roll assemblies 50, to support the carrying run 52 of the belt conveyor, at that portion of the conveyor which receives the material that is discharged from the lower end of grizzly 38. The function of the grizzly 38 is to effect a separation between lumps and fines, thus the material discharged from its lower end will consist of lumps while the finer material will pass between the grizzly bars and fall directly onto the surface of the portion of the carrying run 52 at the right of the impact absorption unit 48 in FIG. 1. The fines which pass through the grizzly 38 in this manner, together with the material loaded upon the carrying run of the conveying belt from the chute 46, provide a layer of relatively fine material upon the surface of the belt to assist in cushioning the impacts of the lumps of materials which are discharged from the end of the grizzly bars.

With the exception of the impact absorption unit 48, the belt conveyor 40 is of substantially conventional construction in which the carrying run 52 is supported upon the troughed roll idlers 50 while the return run 54 is supported by suitably located return roll idlers 56. Both the troughed idlers 50 and the return idlers 56 are mounted upon a suitably constructed fixed supporting framework, designated generally 58, in a manner well known to those skilled in the art. A selected amount of tension is applied to the belt by mounting the foot pulley 60 of the conveyor upon a carriage 62 which is mounted for movement longitudinally of the conveyor 40 upon a frame or track assembly 64. The carriage 62 is continually urged in a direction to apply tension to the belt by a counterweight 66 which is connected to the carriage 62 by means of a suitable cable and pulley arrangement designated generally 68. By a suitable selection of the mass of the counterweight 66, a desired tension may be applied to the belt of the conveyor 40 which remains constant under normal conditions while at the same time permitting a yielding of the belt under abnormal load conditions.

The constructional details of the main loading chute 30 may be best appreciated by reference to FIGS. 3 through 8 of the drawings. It will be seen from FIGS. 2, 3 and 4 that the loading chute is completely enclosed by panels or metal plates, indicated generally at 70, which are supported from a suitably designed fixed framework of structural members designated generally 72. Since the exact construction and arrangement of the metal enclosure and framework do not form an essential part of the invention and in fact may vary widely between installations, a detailed description of these elements will be omitted.

The primary purpose of the fixed framework 72 is to provide a firm support for the inclined chute section 36 and the grizzly assembly 38. The section 36 and the grizzly assembly 38 are both disposed within the enclosure 70 to support and guide the material during its passage from the plate feeders 32 and 34 onto the carrying run 52 of the belt conveyor. The walls of the enclosure 70 serve primarily to confine the gravitational flow of the material to the section 36 and grizzly 38.

Since the inclined chute section 36 receives the impact of the material which falls freely from the respective discharge ends of the plate feeders 32 and 34, the section 36 is of extremely rugged construction. As best seen in FIGS. 4 and 5, the section 36 includes a plurality of heavy transversely extending frame members 74 which are securely riveted or bolted to the side plates of the enclosure 70 as best seen in FIG. 5. A closure plate 76 is secured on the frame members 74, by any suitable means such as welding. The surface which receives the material falling from the plate feeders is constructed from a plurality of sections of railway rails 78 which extend longitudinally the entire length of the section 36. As best seen in FIG. 5, base flanges of these rails are disposed in parallel abutting side-by-side relationship upon the plate 76 to which they may be secured by any suitable means, such as welding.

Material discharged from the lower end of the inclined section 36 falls upon the upper end of the grizzly assembly 38. Like the section 36, the surface traversed by the material passing over the grizzly 38 is defined by a longitudinally extending series of bar-like members 80 (most clearly shown in FIGS. 6, 7 and 8). The members 80 are supported upon a plurality of transversely extending frame members 82 which in turn are supported from the side plates of the enclosure 70, as by the angle brackets 84 of FIGS. 7 and 8.

All of the members 80 are identical and, as best appreciated from FIGS. 7 and 8, each includes a vertically extending flange or body portion 86 having an enlarged head 88 of a generally hexagonal cross section extending the entire length of the upper edge of the body portion 86. The longitudinally extending head 88 is tapered smoothly from one end to the other, the larger ends of the members 88 all being located at the upper end of the grizzly 38.

As best seen in FIGS. 6, 7, and 8, the members 80 are mounted upon the cross frame members 82 in spaced parallel relationship thus defining longitudinally extending openings in the grizzly through which the smaller lumps of material may pass during the transit of the material over the grizzly. Because of the taper of the respective rail-like members 80, these longitudinally extending openings are wider at the lower end of the grizzly than at the upper end.

The members 80 are mounted upon the cross frame members 82 by forming slots in the members 82 into which the flanges 86 of the members 80 may be seated. Where each flange 86 is seated within a slot, the member 80 may be secured to the frame member 82 by welding. The slots are so arranged in the various frame members 82 that the upper surfaces of all of the members 80 are in substantial horizontal alignment at the extreme upper end of the grizzly while the lower ends of the respective members 80 are arranged, as best seen in FIG. 7, so that the "conveying surface" defined by the heads of the grizzly bars 80 is lowered toward the longitudinal center line of the grizzly whereby material flowing down the grizzly gravitates toward the longitudinal center line as the material approaches the lower end of the grizzly 38.

Referring now to FIGS. 3, 4, 9 and 10, the centralizing or troughing action imparted to the material by the grizzly is further assisted by the provision of the oppositely inclined deflecting plates 90 which project into the interior of the chute below the lower end of the grizzly and above the carrying run 52 of the conveyor 40. The inward extent of the respective plates 90 is selected to be such that the material is so centrally deposited upon the carrying run of the conveyor 40 that its natural angle of repose does not cause the material to overflow the edges of the belt. As best appreciated from FIGS. 3, 9 and 10, the deflecting plates 90 extend longitudinally along and above the carrying run 52 of the conveyor from the lowermost end of the chute 46 to a location well beyond the impact loading section 48.

To exert a controlling effect upon the rate of flow of material through the chute 30, a flexible barrier 92 is suspended in the material passage above the chute 30 adjacent to and above the lower end of the grizzly 38. As best seen in FIGS. 3 and 4, the flexible barrier 92 takes the form of a plurality of freely suspended lengths of heavy chain which substantially fill the interior of the passage within the chute 30.

Since the material which is discharged from the lower end of the grizzly 38 consists primarily of the larger lumps of material, the carrying run 52 of the belt conveyor 40 is supported in the region beneath the discharge end of the grizzly 38 by an impact absorption unit 48 which is especially constructed to minimize wear and abrasion to the belt. In FIG. 12, a plan view of the impact absorption unit 48 is shown as it would appear with the carrying run 52 of the belt removed.

The impact absorption unit 48 includes a pair of side frame members 100 which extend along the opposite sides of the conveyor in a direction parallel to the carrying run 52, as best appreciated from a comparison of FIGS. 1, 3, 10 and 12. In view of the substantial impact loads which must be absorbed by the unit 48, the side frame members 100 are mounted upon a suitably constructed fixed supporting framework designated generally 102. As best appreciated from FIGS. 3, 9 and 10, each of the side frame members 100 includes spaced upper and lower channel members 104, 106 joined to each other by inner and outer side plates 108, 110 which are welded to the outer surfaces of the flanges of the channel members 104, 106 whereby each side frame member 100 may be generally described as an elongated hollow box-like unit.

The side plates 108 and 110 of each frame member are drilled at a plurality of locations to provide transversely aligned openings 112 which are dimensioned to slidably receive and guide coupling rods 114. As best appreciated from FIG. 12, the openings 112 in each of the side members serve to locate the various coupling rods 114 in transversely opposed paired positions at opposite sides of the carrying run of the conveyor. Between each transversely opposed pair of coupling rods 114, a flexible idler roll assembly is provided which includes, in the disclosed installation, five roll units 116 pivotally connected to each other in end-to-end relationship to form a chain having a length approximately equal to the width of the conveying belt. Pivotal connections designated generally 118 between adjacent roll units 116 permit the adjacent units 116 to pivot relative to each other about axes which extend parallel to the carrying run 52. The end roll units 116 are coupled to the respective rods 114 by similarly oriented pivotal connections 120.

The rods 114 are in turn suspended in the respective side members 100 by means of resiliently biased flexible tension members 122, one mounted upon each of the side frame members 100. Each of the side frame members 100 has a pair of longitudinally spaced opposed bracket assemblies 124 which project outwardly from the associated frame member 100 in a direction which may be best described as parallel to the axes of the outermost rolls of the impact roll assemblies when the assemblies are in their normal rest positions. (See in particular FIG. 10.)

At the outermost end of each bracket 124, a box-like housing 126 is located. Each of the housings 126 is constructed with aligned holes 128 through its opposed end walls 130 to slidably receive and guide in movement a hollow tube 132, see FIG. 16. Each tube 132 in turn slidably receives and guides in movement an elongated rod 134 which is supported by means of bushings 136 located at opposite ends of the tube 132. The inner ends of the rods 134 on a given side of the conveyor 40 are coupled to each other by a flexible tension member 122 in the form of a link or chain assembly which will be described in greater detail below.

As best seen in FIG. 16, the outer end of the rod 134 is threaded, as at 140. A spring seat member 142 is slidably received on this end of the rod 134 and is adjustably maintained at a selected position, in opposition to the compressive force exerted by the springs 144 and 146, by means of lock nuts 148 which are threaded onto the section 140 of the rod 134.

The compression springs 144 and 146 act between the seat member 142 on the rod 134 and a stop collar 150 which is welded to the tube 132. As shown in FIG. 16, the left-hand end of the spring 144 is seated upon a spring seat member 152 which serves to center this end of the spring 144 with respect to the tube 132. The compression springs 144 and 146 are, for all practical purposes, a single spring, a pair of oppositely disposed seat members 154 and 156 being slidably mounted upon the tube 132 between the adjacent ends of the springs 144 and 146 so that forces applied to one spring are transmitted directly to the other.

The structure of the flexible tension member 122 is best illustrated in FIGS. 18 and 19. As shown in these figures, the inner ends of each pair of rods 134 are connected to each other by a series of pivotally connected links 158, such pivotal connection each taking the form of a pivot pin 160 which is maintained in position by locking pins 162. A similar connection exists between each of the endmost set of links 158 and the respective rods 134. Each of the pivot pins 160 further serves to pivotally secure to the links 158 a coupling link 164 which is free to pivot about the pin 160 relative to the links 158. The opposite ends of the coupling links 164 are pivotally pinned to the outer ends of the respective coupling rods 114 for relative pivotal movement about an axis parallel to the axis of the associated pivot pin 160. As best seen in FIG. 18, the coupling links 164 are of differing lengths whereby the flexible link assembly 122 is arranged to approximate a catenary curve when the various elements of the impact section are in their normal or rest positions.

From a consideration of FIG. 12, it is believed apparent that the net effect of the four sets of compression springs 144, 146 is to apply a normally balanced force to each of the impact idler roll assemblies tending to draw the respective assemblies into as nearly a horizontal position as possible. This effect is limited by providing a fixed stop collar 166, see FIGS. 9 and 10, on each of the coupling rods 114 to limit the movements of rods 114 outwardly through the side frame members 100. Thus, the normal orientation of each roll assembly is that shown in FIG. 10 which may be said to approximate a catenary curve, the degree of approximation improving as the number of roll units per assembly is increased. As best seen in FIG. 9, each impact idler roll unit of this installation causes the belt to depart slightly from its normal troughed relation, as indicated at A, B, C and D. Any disadvantage accruing from this small disparity of configuration are overcome by the advantages attained because of the greater transverse flexibility of the impact idler roll assembly.

FIG. 11 is a sketch showing the deflection of one of the impact idler roll assemblies under the application of an impact blow. The normal orientation of the individual rolls 116 is indicated in solid lines, the solid line showing corresponding to the more detailed drawing of the normal position of the idler roll assemblies 116 in FIG. 10 immediately above. The broken line showing of FIG. 11 illustrates the displacement of the respective roll units from their normal position under the application of an impact load delivered approximately along the center line of the carrying run of the belt, a condition which will normally obtain because of the centering action of the deflecting plates 90. However, the idler rolls may assume other, unsymmetrical positions if the application of the impact load is on one or the other side of the center line of the carrying run of the belt. It will be noted that the roll units other than the center unit partake not only of vertical movement but may also move transversely of the conveyor belt to follow movement of each individual portion of the belt which will occur as the belt is deformed under the impact load.

Constructional details of the roll units 116 and the pivotal couplings 118 between adjacent units are shown in FIGS. 13 through 15.

Each of the impact roll units 116 includes a shaft 170 which is threaded at each end, as at 172. A hollow hub 174 is supported upon the shaft 170 by means of a roller bearing 176 located adjacent each end of the hub 174. As best shown in the section of FIG. 13, the hollow hub 174 is formed with two concentric counterbores 178 and 180 at each end, the innermost counterbore having a bearing retainer 182 seated at its innermost end against which the bearing 176 is seated. The bearing 176 is maintained in seated engagement with the retainer 182 by means of a collar 184 having a sliding sealing fit upon the shaft 170, the collar 184 being forced against the bearing 176 by means of jam nuts 186 which are tapped to engage the thread section 172. A grease seal assembly 188 is provided between the stationary collar 184 and the rotatable hub 174.

A plurality of heavy duty rubber impact rolls 190 are mounted upon the hub 174 and maintained in the desired axially spaced relationship by means of annular metal spacers 192 which are each clamped to the hub 174 by means of a plurality of set screws 194. The outermost rolls 196 are constructed to have a somewhat deeper flange on their outermost sides, as distinguished from the symmetrically cross sectioned flanges of the rolls 190, in order that the retaining elements of the outer roll need not project beyond the surface of the outer flange of the roll 196. The retaining assembly for each outer roll includes a washer 198 which is held into axial engagement with the outermost roll 196 by a pair of jam nuts 200 which are threaded onto the outer end of the hub 174.

One end of the shaft 170 is bored axially as at 202 and the inner end of the axial bore 202 is intersected by a radial bore 204 which opens into the interior of the hub 174 inwardly of the roller bearings 176. The outer end of the axial bore 202 is provided with a conventional grease fitting 206 by means of which the bearings 176 may be adequately lubricated.

Each of the coupling assemblies 118 includes a pair of mating members 208, each of which includes an enlarged central portion 210 which is drilled and tapped to threadedly engage the section 172 on the shaft 170. From each side of the central section 210, an arm 212 projects. One of the arms 212 is provided with a single extension 214 while the opposed arm of the member 208 is constructed with two identical, parallel extensions 216. The extensions 214 and 216 are so located with respect to the tapped bore in the central section 210 that when two members 208 are located with the axes of their respective tapped bores in alignment, the single extension 214 on one side of one member may be received between the paired extensions 216 of the other member, as shown in FIG. 14. The respective extensions are drilled so that when they are located in the aforementioned position, a pivot pin 218 may be inserted through the respective openings to pivotally couple the units 208 to each other.

Two separate pivot pins 218 are employed in each mating pair of units 208. The pins 218 are held in position by means of locking pins 220. The central section 218 of each unit 208 is drilled and tapped to receive a set screw 222 to clamp the unit in position upon its respective shaft 170.

To briefly review the operation of the apparatus, the coal or other material to be loaded upon the belt conveyor is fed into the hopper 30 by the reciprocating plate feeders 32 and 34. Any material which may spill over the sides of the feeders during operation is collected in the hoppers 42 and 44 and conducted to the belt conveyor. The material passing from the hopper 44 is conducted to the conveyor by the chute 46 and dumped onto the carrying run of the conveyor at a location between the foot pulley 60 and the impact loading section 48. This material is deposited on the carrying run of the belt to form a layer of relatively fine material which serves to cushion impacts received by the belt from the heavier or larger lumps of material which fall upon the belt at the impact loading section. The material passing through the hopper 42 drops directly onto the grizzly 38 then passes between the bars of the latter to fall upon the carrying surface of the belt at a location which is again below the impact loading section.

Material fed into the hopper 30 passes down the chute 36 and onto the bars of grizzly 38. As previously explained, the spacing between the grizzly bars permits the finer particles to drop directly between the bars and onto the conveying belt to assist in building up the cushioning layer of finer particles. The lumps are discharged from the lowermost end of the grizzly bar onto the belt at what may be best described as a loading station defined by the portion of the carrying run of the belt which is supported by the rolls of the impact loading section 48. As described above, each of the roll assemblies of the impact loading section is free to flex to permit the belt to depart from its normal troughed configuration on the application of impact loads. In addition to the flexible deformation permitted by the flexible idler roll assemblies, a certain portion of the impact of the larger lumps of material on the conveyor belt is absorbed by the resiliency of the rubber wheels of the individual roll units.

The major portion of the impact is absorbed, however, by the compression springs 144 and 146 which permit the individual roll assemblies to move bodily or deflect under the application of an impact load. As has been previously stated, the stop members 166 on each of the roll assemblies limit the amount of tension which may be applied to the latter to a degree which permits each assembly to be loosely suspended in an approximation of a catenary curve between the respective side frame members 100. Because of this configuration, the initial compression load on each of the springs may be adjusted as desired by manipulation of the nuts 148.

While we have disclosed and described but one embodiment of our invention, it will be apparent to those skilled in the art that the disclosed embodiment is capable of modification. Therefore, the specification is to be considered exemplary rather than limiting and the true scope of the invention is that defined in the following claims.

Having thus described the invention, we claim:

1. In combination with a belt conveyor having a carrying run, an impact absorption unit comprising a plurality of flexible antifriction assemblies extending beneath said carrying run, a coupling member at each end of each of said assemblies projecting transversely beyond the adjacent side of said carrying run, support means located adjacent each side of said carrying run slidably receiving said coupling members to guide said coupling members in movement transversely of said carrying run, stop means on each of said coupling members engageable with said support means to limit movement of said coupling members laterally away from said carrying run, flexible means arranged generally lengthwise of, and laterally outwardly of, each of said support means, each of said flexible means being pivotally connected to all of the said coupling members which are slidably guided in the adjacent one of said support means, and means on each of said support means for exerting tension forces on the adjacent flexible means for biasing the coupling members connected to the flexible means outwardly from said carrying run to resiliently urge said stop means toward the associated support means to thereby maintain said antifriction assemblies in uniform underlying resilient supporting relationship with said carrying run.

2. In combination with a belt conveyor having a carrying run, an impact absorption unit comprising a plurality of flexible antifriction assemblies extending transversely beneath said carrying run, each of said assemblies comprising a series of axially elongated roll units, means pivotally coupling said roll units to each other in end-to-end relationship to form a chain of roll units having a length approximately equal to the width of the conveying belt, the pivotal axes of said coupling means being oriented in directions parallel to said carrying run, coupling members connected to the outer ends of the roll units at the ends of said chain and projecting from the respective end roll units laterally of the sides of said carrying run, a support member extending parallel to and adjacent each side of said carrying run and slidably receiving all of the coupling members projecting from the associated side of the carrying run to support and guide the latter in movements laterally of said carrying run, a common resilient means on each of said support members and means connecting said common resilient means to each of the coupling members received in the associated support member to bias said coupling members outwardly from said carrying run and maintain said roll units in resilient underlying supporting relationship with said carrying run.

3. The combination defined in claim 2 including a stop member fixedly mounted upon each of said coupling members for engagement with the support member in which the coupling member is received to limit movement of the coupling member laterally away from said carrying run.

4. The combination defined in claim 3 wherein the stop members for all of said antifriction assemblies are located on the respective coupling members to permit the respective chains of roll units, when said stop members engage said support member, to be suspended between the support members in similar approximations of a caternary curve transversely of said carrying run to thereby support said carrying run in a troughed configuration.

5. In combination with a belt conveyor having a carrying run and means for delivering material onto said carrying run at a loading station; an impact absorption unit comprising a plurality of flexible antifriction roll assemblies extending transversely beneath said carrying run at longitudinally spaced positions encompassing the longitudinal extent of said loading station, a coupling member connected to each end of each of said assemblies and projecting laterally from the assembly beyond the adjacent side of said carrying run, support means located adjacent each side of said loading station slidably receiving said coupling members to guide the latter in their movements laterally of said carrying run, a flexible tension member associated with each of said support means, means on each of said support means suspending the associated tension member between two longitudinally spaced locations beyond opposite longitudinal ends of said loading station, means connecting each of the coupling members received in each support means to the tension member suspended therefrom, and means acting on said tension member to resiliently bias the coupling members connected thereto outwardly from said carrying run to resiliently maintain said antifriction assemblies in underlying supporting relationship with said carrying run.

6. In combination with a belt conveyor having a carrying run and means for delivering material onto said carrying run at a loading station; an impact absorption unit comprising a plurality of flexible antifriction roll assemblies extending transversely beneath said carrying run at longitudinally spaced positions encompassing the extent of said loading station, a coupling member connected to each end of each of said assemblies and projecting laterally from the assembly beyond the adjacent side of said carrying run, support means located adjacent each side of said loading station slidably receiving said coupling members to guide the latter in their movements laterally of said carrying run, a flexible tension member associated with each of said support means, each of said tension members comprising a series of rigid links pivotally connected to each other in end-to-end relationship, means on each of said support means suspending the associated tension member between two longitudinally spaced locations beyond the opposite longitudinal ends of said loading station, means pivotally coupling each of the coupling members received in each support means to the tension member suspended therefrom, and means acting on said tension member to resiliently bias the coupling members connected thereto laterally from said carrying run to maintain said antifriction assemblies in underlying supporting relationship with said carrying run.

7. The combination defined in claim 6 including a stop means mounted on each of said coupling members engageable with the support means in which the coupling member is received to limit movement of said coupling members laterally of said carrying run.

8. The combination defined in claim 6 wherein the means pivotally connecting each of said coupling members to its associated tension member comprises a pin passing through the coupling member and a pair of adjacent links of said tension member, said pin also serving to pivotally connect the pair of links in the aforementioned end-to-end relationship.

9. In combination with a belt conveyor having a carrying run and means for delivering material onto said carrying run at a loading station; an impact absorption unit comprising a plurality of flexible antifriction roll assemblies extending transversely beneath said carrying run at longitudinally spaced positions encompassing the extent of said loading station, a coupling member connected to each end of each of said assemblies and projecting laterally from the assembly beyond the adjacent side of said carrying run, a pair of support members extending parallel to said carrying run, one support member being located adjacent each side of said loading station and slidably receiving the coupling members projecting beyond the adjacent side of said carrying run to support and guide said coupling members in their movements laterally of said carrying run, a pair of brackets fixedly mounted on each of said support members, said brackets being located at positions beyond the opposite ends of said loading station and projecting outwardly from the associated support member away from said carrying run, a flexible tension member suspended between each pair of brackets, means pivotally connecting each of the coupling members received in each support member to the tension member suspended therefrom at locations on said tension member between the pair of brackets from which said tension member is suspended, and means connected between each tension member and the pair of brackets from which the tension member is suspended to resiliently tension the tension member to thereby bias the coupling members connected thereto laterally from said carrying run to maintain said antifriction assemblies in underlying supporting relationship with said carrying run.

10. The combination defined in claim 9 wherein each of said tension members comprises a series of rigid links pivotally connected to each other in end-to-end relationship, and a rigid member pivotally connected to each of the endmost links of each series, each rigid member being slidably received in one of the pair of brackets, and said resilient means comprises a compression spring connected to act between each bracket and the rigid member received therein.

11. The combination defined in claim 10 wherein the means pivotally connecting each coupling member to said tension member comprises a pin passing through the coupling member and a pair of adjacent links of said tension member, said pin also serving to pivotally connect the pair of links in the aforementioned end-to-end relationship.

12. In combination with a belt conveyor having a carrying run and means for delivering material onto said carrying run at a loading station; an impact absorption unit comprising a plurality of flexible antifriction roll assemblies extending transversely beneath said carrying run at longitudinally spaced positions encompassing the extent of said loading station, a coupling member connected to each end of each of said assemblies and projecting laterally from the assembly beyond the adjacent side of said carrying run, a pair of support members extending parallel to said carrying run, one support member being located adjacent each side of said loading station and slidably receiving the coupling members projecting laterally of the adjacent side of said carrying run to support and guide said coupling members in their movements laterally of said carrying run, a stop member on each of said coupling members engageable with the support member in which the coupling member is received to limit movement of the coupling member laterally from said carrying run to cause each of said flexible roll assemblies to be suspended between the support members in a manner supporting the carrying run of said belt in a troughed configuration, a pair of brackets fixedly mounted on each of said support members, said brackets being located at positions beyond the opposite longitudinal ends of said loading station and projecting outwardly from the associated support member away from said carrying run, a flexible tension member suspended between each pair of brackets, means connecting each of the coupling members reecived in each support member to the tension member suspended therefrom at locations on said tension member intermediate the pair of brackets from which said tension member is suspended, and means connected between each tension member and the pair of brackets from which the tension member is suspended to resiliently tension said member to thereby bias said stop members into engagement with the associated support members and to permit resiliently cushioned movement of said coupling members inwardly of said carrying run and flexing movement of said roll assemblies upon the application of impact loads to said carrying run.

13. An impact loading section for a belt conveyor having a carrying run comprising: a fixed support member extending parallel to said carrying run at opposite sides thereof, a pair of brackets mounted on each of said support members, said brackets projecting laterally from longitudinally spaced positions on the support member away from said carrying run, a flexible tension member resiliently suspended between each pair of brackets outwardly of the support member, a like number of coupling members connected to each tension member at longitudinally spaced positions thereon intermediate said brackets, said coupling members being slidably received in the adjacent support member and projecting inwardly therethrough at transversely opposed locations on the respective support members, and a flexible antifriction roll assembly suspended between each transversely opposed pair of coupling members in underlying supporting relationship with said carrying run.

14. An impact loading section as defined in claim 13 including a stop member mounted on each of said coupling members for engagement with the support member in which the coupling member is received to limit movement of the coupling member outwardly from said carrying run, said stop members being located to cause said flexible antifriction roll assemblies to be suspended by their associated coupling members in a manner to support the carrying run of said belt in a troughed configuration.

15. An impact loading section as defined in claim 13 wherein each of said flexible tension members comprises a series of rigid links pivotally connected in end-to-end relationship, the pivotal connection between adjacent links comprising a pin passing through each pair of adjacent links, said pin further serving to pivotally connect a coupling member to said tension member.

16. In a belt conveyor having a material carrying run, the combination comprising a flexible antifriction assembly extending beneath and across said carrying run in supporting relationship therewith, a coupling member pivotally connected to each end of said assembly, a support located adjacent each side of said carrying run having means slidably receiving the respective coupling member and confining it to movement along a fixed path inclined downwardly toward said carrying run in a plane transverse to said run, a pair of bracket assemblies mounted on and projecting laterally outwardly of each support, the two bracket assemblies of each pair being spaced from each other longitudinally of their support, a flexible tension member extending generally longitudinally of said support between said spaced bracket assemblies of each pair, means connecting each coupling member to the intermediate portion of its adjacent flexible tension member, means carried by each bracket assembly for applying a resilient tension force to the adjacent end of its flexible tension member to apply a biasing force to each of said coupling members acting along said path in opposition to the force applied to said coupling member as the result of loads applied to said antifriction assembly through said carrying run, and a stop on each of said coupling members for limiting its movement in the direction of said biasing force.

17. The combination as defined in claim 16 further characterized by said means for applying said resilient tension force including a spring and means for adjusting said spring to vary the force applied to said coupling members.

References Cited in the file of this patent

UNITED STATES PATENTS

| | | |
|---|---|---|
| 909,833 | Vrooman | Jan. 12, 1909 |
| 2,290,434 | Johnson | July 21, 1942 |
| 2,554,077 | Weggum | May 22, 1951 |
| 2,883,035 | Erisman | Apr. 21, 1959 |

FOREIGN PATENTS

| | | |
|---|---|---|
| 762,494 | Great Britain | Nov. 28, 1956 |